UNITED STATES PATENT OFFICE.

HIRAM J. BALL, OF OSWEGO, NEW YORK.

IMPROVEMENT IN RUBBER CEMENTS.

Specification forming part of Letters Patent No. 109,570, dated November 29, 1870; antedated November 19, 1870.

*To all whom it may concern:*

Be it known that I, HIRAM J. BALL, of Oswego, county of Oswego and State of New York, have invented a new and useful Rubber Cement, composed of the following ingredients: Bisulphuret of carbon, india-rubber, and asphaltum.

The following are the proportions: One pound of bisulphuret of carbon; one-half ounce of pure india-rubber; one-eighth of an ounce of asphaltum.

Said cement is prepared by mixing together the bisulphuret of carbon and the india-rubber in the proportions stated above, and letting the mixture stand for thirty-six hours, then adding the asphaltum in the proportion stated above, and the cement is ready for immediate use.

Said cement is used in mending india-rubber overshoes, india-rubber belting, rubber hose, also for fastening rubber soles on leather boots or shoes.

The superiority of this cement to all other cements of a like kind consists in its being ready for immediate use after mixture; also, the articles mended can be used immediately after mending. Said cement is water-proof, can be quickly applied, and is durable.

What I claim as my invention, and desire to secure by Letters Patent, is—

The improved cement made by combining rubber and asphaltum in solution, substantially in the manner specified.

The above specification of this said invention signed and witnessed at Oswego city, N. Y., this 1st day of March, 1869.

HIRAM J. BALL.

Witnesses:
M. J. GILLESPIE,
J. B. HIGGINS.